United States Patent [19]

Takeda et al.

[11] Patent Number: 5,254,411
[45] Date of Patent: Oct. 19, 1993

[54] FORMATION OF HEAT-RESISTANT DIELECTRIC COATINGS

[75] Inventors: Yoshihumi Takeda; Toshinobu Ishihara; Ken'ichi Ito, both of Niigata, all of Japan

[73] Assignee: Shin-Etsu Chemical Co., Ltd., Tokyo, Japan

[21] Appl. No.: 803,486

[22] Filed: Dec. 4, 1991

[30] Foreign Application Priority Data

Dec. 5, 1990 [JP] Japan .................. 2-405377
Dec. 5, 1990 [JP] Japan .................. 2-405378

[51] Int. Cl.$^5$ ................................. B32B 9/04
[52] U.S. Cl. ................................ 428/447; 427/377; 427/387
[58] Field of Search ................. 427/377, 387

[56] References Cited

FOREIGN PATENT DOCUMENTS 337618 10/1989 European Pat. Off. .
372381  6/1990 European Pat. Off. .
377118  7/1990 European Pat. Off. .
234069  8/1988 Japan .
2-58580  2/1990 Japan .
2092534  4/1990 Japan .

OTHER PUBLICATIONS

Patent Abstracts of Japan, vol. 14, No. 291 (M-989) Jun. 22, 1990 and JP A-2,092,534 (Showa Electric Wire & Cable Co. Ltd.) Apr. 3, 1990.
Patent Abstracts of Japan, vol. 13, No. 29 (C-562) (3377) Jan. 23, 1989 and JP A-63-234 069 (Showa Electric Wire & Cable Co., Ltd.) Aug. 29, 1988.
Chemical Abstracts, vol. 100, No. 20, May 1984, Columbus Ohio, US; Abstr. No. 160896H, Kazakov M. E. et al., Thermal. Transformations of Methyl Phenyl Oligocyclosilazanes on a Carbon Susbstrate.
Chemical Abstracts vol. 90, No. 14, Apr. 1979, Columbus Ohio, U.S.; Abs. No. 108623C, Mazaev V. A. Material Made from Polymer Saturated Boron Nitride.

*Primary Examiner*—Michael Lusignan
*Attorney, Agent, or Firm*—McAulay Fisher Nissen Goldberg & Kiel

[57] ABSTRACT

Heat resistant, dielectric coatings are formed by applying a heat resistant coating composition comprising an organic silicon polymer, a silazane compound, and an inorganic filler to a substrate, and baking the coating in ammoniacal atmosphere at 200° to 1000° C. Similarly, heat resistant, dielectric coatings are formed by applying the same composition as above to a substrate, baking a first coating layer in air, applying an organic silicon polymer base coating composition to the first coating layer, and baking a second coating layer in ammoniacal atmosphere.

12 Claims, No Drawings

FORMATION OF HEAT-RESISTANT DIELECTRIC COATINGS

This invention relates to a method for forming heat-resistant, dielectric coatings having improved adhesion, heat resistance, and electric insulation.

BACKGROUND OF THE INVENTION

Polyorganosiloxane base coating compositions are superior in heat resistance to coating compositions on organic polymers such as polyester and polyimide, but cannot withstand elevated temperatures of higher than 400° C. for a long time.

In the recent years, there is an increasing demand for coating compositions capable of preventing oxidation and corrosion of metallic and non-metallic substrates which are serviced at high temperatures in excess of 1000° C. It is also desired to develop coating compositions which form coatings maintaining electric insulation at high temperatures and having good adhesion.

A variety of heat resistant coating compositions have been proposed in the art. (1) Japanese Patent Application Kokai (JP-A) No. 54768/1987 discloses a composition comprising polytitanocarbosilane, silicone resin, and inorganic filler. (2) JP-A 235370/1987 discloses a composition comprising polycarbosilane, silicone resin, and inorganic filler. (3) JP-A 92969/1990 discloses a heat resistant coating composition having organometallic polymer and silicon dioxide blended therein. (4) Japanese Patent Publication No. 50658/1983 discloses a composition comprising borosiloxane resin.

These proposals, however, have some drawbacks. Heat resistant coating compositions (1) and (2) are unsatisfactory in adhesion to substrates at high temperatures, crack resistance of coatings, and high-temperature electric insulation. Heat resistant coating composition (3) suffers from separation and cracking of coatings at high temperatures and poor electric insulation. Heat resistant coating composition (4) is poor in water resistance and high-temperature electric insulation. The previously proposed approaches do not satisfy all the requirements of high-temperature adhesion, heat resistance, water resistance, and electric insulation. There is a need for developing a heat resistant coating composition capable of satisfying all such requirements.

SUMMARY OF THE INVENTION

Therefore, an object of the present invention is to provide a method for forming coatings which firmly adhere to metallic and non-metallic substrates, and have improved heat resistance, water resistance, solvent resistance, corrosion resistance, and high-temperature electric insulation.

The inventors have found that by applying a heat resistant coating composition comprising an organic silicon polymer, a silazane compound, and an inorganic filler to a conductive or non-conductive substrate, and baking the composition in ammonia gas or a mixture of ammonia and an inert gas, there are formed ceramic heat-resistant, dielectric coatings on the substrate featuring improved properties including heat resistance, electric insulation and close adhesion as well as high hardness, water resistance, chemical resistance and solvent resistance.

Also the inventors have found that by forming a first coating layer on a substrate from a heat resistant coating composition comprising an organic silicon polymer, a silazane compound, and an inorganic filler, and then forming a second coating layer on the first coating layer from a coating composition comprising an organic silicon polymer, especially by baking the second coating layer in ammonia gas or a mixture of ammonia and an inert gas, there are formed composite coatings featuring improved properties including heat resistance, water resistance, close adhesion, solvent resistance, and electric insulation.

Therefore, in a first form, the present invention provides a method for forming a heat resistant, dielectric coating comprising the steps of applying a heat resistant coating composition comprising an organic silicon polymer, a silazane compound, and an inorganic filler to a substrate; and baking the coating in an atmosphere of ammonia gas or a mixture of ammonia gas and an inert gas.

In a second form, the present invention provides a method for forming a heat resistant, dielectric coating comprising the steps of applying a heat resistant first coating composition comprising an organic silicon polymer, a silazane compound, and an inorganic filler to a substrate; baking the first composition to form a first coating layer; applying a second coating composition comprising an organic silicon polymer to the first coating layer; and baking the second composition to form a second coating layer on the first coating layer, preferably in an atmosphere of ammonia gas or a mixture of ammonia and an inert gas.

DETAILED DESCRIPTION OF THE INVENTION

The present invention uses a heat resistant coating composition comprising an organic silicon polymer, a silazane compound, and an inorganic filler as essential binding components.

A first essential component of the heat resistant coating composition according to the present invention is an organic silicone polymer which is preferably selected from polycarbosilanes and polysilazanes.

The polycarbosilanes are known from JP-B 26527/1982 (or U.S. Pat. No. 4,052,430, DE 2618246, FR 2308650 and GB 1551952), for example. Such polycarbosilanes may be synthesized, for example, by reacting dimethyldichlorosilane with metallic sodium and subjecting the resulting polysilanes to pyrolytic polymerization.

The polysilazanes are known from the following patent publications and applications, all by Shin-Etu Chemical Co., Ltd.

(1) JP-A 290730/1987 which corresponds to U.S. Pat. Nos. 4,771,118 and 4,870,035, FR 2,599,745 and DE 3,719,343 A1 and discloses a process for manufacturing an organic silazane polymer which comprises reacting ammonia with a mixture of methyldichlorosilane, methyltrichlorosilane and dimethyldichlorosilane to obtain an ammonolysis product, and polymerizing the ammonolysis product in the presence of a basic catalyst capable of deprotonation to obtain an organic silazane polymer. Preferably, the mixing ratios of methyldichlorosilane, methyltrichlorosilane and dimethyldichlorosilane are in ranges of 55 to 80 mol %, 10 to 30 mol % and 5 to 25 mol %, respectively.

(2) JP-A 117037/1988 and 193930/1988 which correspond to U.S. Pat. No. 4,869,854, FR 2,606,777 and DE 3,736,914 A1 and discloses a process for manufacturing an organic silazane polymer which comprises:

reacting ammonia with a mixture consisting of at least one compound selected from the group consisting of organic silicon compounds of the formula (I);

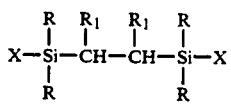

at least one compound selected from the group consisting of organic silicon compounds of the following formula (II);

and at least one compound selected from the group consisting of organic silicon compounds of the following formula (III);

in which R represents hydrogen, chlorine, bromine, methyl radical, ethyl radical, phenyl radical or vinyl radical; $R_1$ represents hydrogen or methyl radical, $R_2$ represents hydrogen, methyl radical, ethyl radical, phenyl radical or vinyl radical and X represents chlorine or bromine, to obtain an ammonolysis product, the mixing ratios of the organic silicon compounds shown by the above formulae (I), (II), and (III) being in ranges of 1 to 25 mol %, 1 to 25 mol %, and 50 to 80 mol %, respectively, and polymerizing the ammonolysis product in the presence of a basic catalyst capable of deprotonation to obtain an organic silazane polymer. Preferably, the amounts of hydrogen, vinyl radical and alkyl or phenyl radical in $R_2$ of the organic silicon compounds of the formulae (II) and (III) are in ranges of 55 to 90 mol %, 0 to 30 mol % and 0 to 30 mol %, respectively.

(3) JP-A 210133/1988 which corresponds to U.S. Pat. No. 4,847,345, FR 8802317 and DE 3805796 A and discloses a process for manufacturing an organic silazane polymer which comprises reacting an organic silicon compound of the following formula (I):

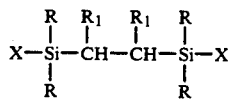

in which R represents hydrogen, chlorine, bromine, methyl radical, ethyl radical, phenyl radical or vinyl radical, $R_1$ represents hydrogen or methyl radical and X represents chlorine or bromine, or a mixture of an organic silicon compound of the formula (I) above and an organic silicon compound of the following formula (II):

in which $R_2$ and $R_3$ represent hydrogen, chlorine, bromine, methyl radical, ethyl radical, phenyl radical or vinyl radial and X represents chlorine or bromine with a disilazane of the following formula (III):

in which $R_4$, $R_5$, $R_6$ represents hydrogen, methyl radical, ethyl radical, phenyl radical or vinyl radical in an anhydrous state at a temperature of from 25° C. to 350° C. while distilling off by-produced organic ingredients out of the system to obtain an organic silazane polymer. Preferably, the mixing ratio of the organic silicon compounds shown by the above formulae (I) and (II) is in the range of 50 to 100 mol %: 0 to 50 mol %.

(4) JP-A 153730/1989 which discloses a method for preparing an organic silazane polymer comprising the steps of: reacting ammonia with a mixture of an organic silicon compound of the following formula (I):

in which R represents methyl radical, ethyl radical or phenyl radical and X represents chlorine or bromine, and an organic silicon compound of the following formula (II):

in which R represents methyl radical, ethyl radical or phenyl radical, $R_1$ represents hydrogen or vinyl radial and X represents chlorine or bromine, in a mixing ratio of the compounds (I) and (II) ranging from 20:80 to 90:10 (mol %) to obtain a silazane compound, and polymerizing the silazane compound in the presence of an alkali catalyst to obtain an organic silazane polymer.

(5) JP-A 50238/1991, 51315/1991 and 51316/1991 which correspond to U.S. Ser. No. 07/554,129 and EP 409146 A2 and disclose a method for preparing an organic silazane polymer, comprising the steps of:

passing a silazane compound in vapor form through a hollow tube heated at a temperature in the range of from 400° to 700° C. for activating the silazane compound, and thermally polymerizing the silazane compound in a liquid phase. Preferably the silazane compound has the following formula (I) or (II):

$$(CH_3)_3Si-NH-Si(CH_3)_3 \quad (I)$$

-continued

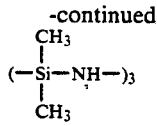

(6) JP-A 81330/1991 which corresponds to U.S. Ser. No. 07/571,132 and EP 417562 A2 and discloses a method for preparing an polytitanocarbosilazane polymer comprising the step of reacting (A) an organic silicon compound of the general formula:

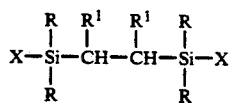

wherein R is selected from the group consisting of hydrogen, chloro, bromo, methyl, ethyl, phenyl and vinyl radicals, $R^1$ is hydrogen or a methyl radical, and X is chloro or bromo, (B) an organic silicon compound of the general formula:

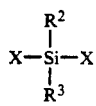

wherein $R^2$ and $R^3$ are independently selected from the group consisting of hydrogen, chloro, bromo, methyl, ethyl, phenyl and vinyl radicals, and X is chloro or bromo, (C) a titanium compound, and (D) a disilazane of the general formula:

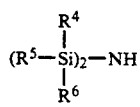

wherein $R^4$, $R^5$ and $R^6$ are independently selected from the group consisting of hydrogen, methyl, ethyl, phenyl and vinyl radicals. Preferably, the compounds of formulae (I) and (II) are mixed in a molar ratio (I)/(II) of from 10/90 to 40/60. The titanium compound is used in an amount of 1 to 10 mol % based on the total of the organic silicon compounds of formulae (I) and (II). The disilazane of formula (III) is used in at least equimolar amount to the total of components (A), (B), and (C).

(7) JP-A 190933/1991 which corresponds to U.S. Ser. No. 07/631,272 EP 434031 A2 and discloses a method for preparing an organic silazane polymer comprising the steps of:

reacting an organic silicon compound of formula (I):

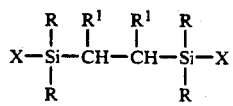

wherein R is selected from the class consisting of hydrogen, chloro, bromo, methyl, ethyl, phenyl, and vinyl, $R^1$ is hydrogen or a methyl, and X is chloro or bromo, or a mixture of an organic silicon compound of formula (I) and an organic silicon compound of formula (II):

wherein $R^2$ and $R^3$ are independently selected from the class consisting of hydrogen, chloro, bromo, methyl, ethyl, phenyl and vinyl, and X is chloro or bromo, with a disilazane of formula (III):

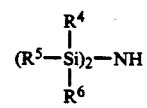

wherein $R^4$, $R^5$ and $R^6$ are independently selected from the class consisting of hydrogen, methyl, ethyl, phenyl and vinyl, at a temperature of 25° to 350° C. in an anhydrous atmosphere, and reacting the resulting organic silazane polymer with ammonia, thereby reducing the residual halogen in the polymer.

(8) JP-A 190932/1991 which discloses a method of preparing a hafnium-containing silazane polymer comprising reacting (A) a halogenated organic silicon compound such as those described above, (B) a hafnium compound of the following formula (I):

$$HfX_4 \quad (I)$$

in which X represents chlorine or bromine, and (C) a disilazane of the following formula (II)

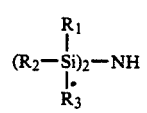

in which $R_1$, $R_2$ and $R_3$ are independently selected from hydrogen, methyl radical, ethyl radical, phenyl radical and vinyl radical.

In the present invention, the polycarbosilanes and the polysilazanes are used as the organic silicone polymers as described above.

Since the degree of polymerization of the organic silicone polymer largely affects coating performance, especially coating crack resistance, the polycarbosilanes should preferably have a number average molecular weight of about 500 top 5,000, more preferably from about 600 to about 2,000, most preferably from about 650 to about 1,200, and the polysilazanes preferably have a number average molecular weight of about 400 to about 3,000, more preferably from about 500 to about 2,000, most preferably from about 550 to about 1,200. Below the lower limit of number average molecular weight, the resulting composition would poorly adhere to substrates. Above the upper limit, cracks would occur in the resulting coatings which could be peeled off during subsequent baking.

The organic silicone polymers may be used alone or in admixture of two or more. Preferably the composition contains about 5 to 50% by weight, more preferably about 15 to 30% by weight of the organic silicone polymer based on the total weight of the composition (organic silicone polymer plus silazane compound plus inorganic powder). Less than 5% by weight of the organic silicone polymer would sometimes be too small to provide the composition with satisfactory heat resistance, adhesion, and coating hardness whereas more than 50% would sometimes form coatings susceptible to cracking and peeling after baking.

The organic silicone polymer component is generally converted into SiC, $Si_3N_4$ and the like by subsequent baking of coatings in an inert gas such as nitrogen and argon. If coatings are baked in air, then the organic silicone polymer component is converted into a ceramic material consisting essentially of SiC, $Si_3N_4$ and $SiO_2$, ensuring that the present composition form fully heat resistant coatings.

A second essential component is a silazane compound which is preferably selected from tetramethyldisilazane, hexamethylcyclotrisilazane, and octamethylcyclotetrasilazane alone or a mixture of two or more.

Preferably the silazane compound is blended in an amount of about 5 to 40%, especially about 10 to 30% by weight of the total weight of the binding components (organic silicon polymer plus silazane compound plus inorganic filler). Less than about 5% of silazane compound would result in less desirable electric insulation whereas more than about 40% of silazane compound would adversely affect coating hardness and adhesion.

A third essential component is an inorganic filler which is preferably selected from $Al_2O_3$, $SiO_2$, $Fe_2O_3$, $TiO_2$, MgO, $ZrO_2\cdot SiO_2$, $3Al_2O_3\cdot 2SiO_2$, $ZnO\cdot MgO$, $Si_3N_4$, SiC, and BN alone or a mixture of two or more. The inorganic filler preferably has a mean particle size of about 0.1 to 30 $\mu$m, especially about 1 to 5 $\mu$m although the particle size is not critical.

Preferably the inorganic filler is blended in an amount of about 10 to 70%, especially about 30 to 60% by weight of the total weight of the binding components. Less than about 10% of filler would incur difficulty of application and pinholes in the coatings whereas more than about 70% of filler would result in low coating adhesion.

The heat resistant coating composition is applied by dissolving and dispersing the organic silicon polymer, silazane compound, and inorganic filler in an organic solvent such as hexane, benzene, toluene, xylene, and N-methylpyrrolidone. The concentration may range from 50 to 500 parts by weight of organic solvent per 100 parts of the binding components.

In the first form of the invention, the above-defined coating composition is first applied to substrates. The type of substrate is not critical and either metallic or non-metallic substrates may be used. Preferably, the substrates are pre-treated on their surface by conventional techniques, for example, by polishing with sand paper followed by removal of oily values.

Any desired technique may be used to apply the coating composition to substrates. Exemplary are brush coating, spray coating, flow coating, dipping, and roll coating. It is preferred to coat the composition to a (wet) thickness of about 20 to 150 $\mu$m, especially about 30 to 100 $\mu$m. Coatings of less than about 20 $\mu$m thick are likely to induce pinholes which are detrimental to corrosion resistance whereas more than 150-$\mu$m thick coatings would partially peel off at the end of baking.

Next, the thus applied coatings are baked after conventional treatment, for example, drying at room temperature.

Baking is carried out in an atmosphere of ammonia gas or a mixture of ammonia and an inert gas. Conventional methods carry out baking in air, which fails to achieve coatings having high electric insulation at high temperatures for the following reason. When coating compositions containing polycarbosilane and polysilazane are baked in air, these components are converted into ceramics of $SiO_2$ type which have poor electric insulation at high temperatures. This can be avoided by baking the coating composition in an atmosphere of either ammonia gas or a mixture of ammonia and an inert gas. Then polycarbosilane and polysilazane components are converted into nitride, $Si_3N_4$ which insures high electric insulation at high temperatures.

Ammonia gas is preferably present in the baking atmosphere at a concentration of about 10 to 100%, especially about 50 to 100%.

Baking conditions may be properly controlled. Desirable is a two-step baking procedure including preliminary drying at room temperature to 300° C., especially 150° to 250° C. for about 5 to 120 minutes, especially about 15 to 60 minutes, and baking at 200° to 1,000° C., especially 400° to 800° C. for about 10 to 120 minutes, especially about 30 to 60 minutes.

In the second form of the invention, the above-defined coating composition is first applied to substrates and baked to form a first coating layer, and thereafter, a coating composition containing an organic silicon polymer is applied and baked to form a second coating layer on the first coating layer.

With respect to the formation of the first coating layer, the method of applying the heat resistant coating composition to substrates and the coating thickness are the same as in the first form. However, baking is preferably carried out in air at a temperature of about 200° C. or higher for about 15 to 60 minutes. Temperature of lower than 200° C. would result in a first coating layer having low strength or hardness. Desirable is a two-step baking procedure including preliminary baking at lower than 250° C. for about 15 to 30 minutes, and baking at 400° to 700° C. for about 15 to 60 minutes. If necessary, baking is carried out in an inert gas atmosphere or another atmosphere.

In this way, there is formed the first coating layer. Since the first coating layer alone cannot provide satisfactory electric insulation at high temperatures, an organic silicon polymer base coating is formed on the first coating layer according to the second form of the invention in order to provide a second coating layer having satisfactory electric insulation at high temperatures.

The second coating layer may be formed by applying an organic silicon polymer, preferably a solution of organic silicon polymer in organic solvent, to the first coating layer. The organic silicon polymer used herein may be polycarbosilane or polysilazane as previously defined.

The degree of polymerization of the organic silicon polymers is selected from the standpoint of crack resistance of the resulting coatings. For example, polycarbosilanes preferably have a number average molecular weight of about 500 to 5,000, more preferably 600 to 2,000, especially 650 to 1,200. Polysilazanes preferably have a number average molecular weight of about 400 to 3,000, more preferably 500 to 2,000, especially 550 to 1,200. These organic silicon polymers are often used by dissolving them in organic solvents such as hexane, toluene, benzene, and xylene. The amount of solvent used varies with the type of organic silicon polymer and the thickness of coatings although the polymer is often diluted with the solvent to a concentration of 10 to 70%, especially 30 to 60% by weight. Dipping, spray coating and other conventional coating techniques may be employed.

Preferably, the organic silicon polymer base coating is about 5 to 150 μm, especially about 10 to 50 μm thick.

After application, the coatings are dried and then baked, preferably in an atmosphere of ammonia gas or a mixture of ammonia and an inert gas as in the previous embodiment. Baking in ammonia gas causes polycarbosilane and polysilazane to convert into $Si_3N_4$ type materials which ensure that the resultant coatings experience no lowering of electric insulation at high temperatures. Baking in another atmosphere is less desirable. For example, baking in inert gas causes polycarbosilane to convert into SiC plus excess carbon and polysilazane to convert into a SiC and $Si_3N_4$ mixed system, both failing to achieve electric insulation at high temperatures. Baking in air results in coatings of $SiO_2$ material which provide less satisfactory electric insulation at high temperatures and sometimes low adhesion and low hardness.

The baking temperature ranges from about 400° to 800° C., preferably from about 600° to 700° C. Nitriding does not take place below about 400° C. so that only coatings of lower hardness are obtained whereas metallic substrates would be attacked by ammonia gas above 800° C.

According to the method of the invention, there can be formed coatings which firmly adhere to metallic or non-metallic substrates, have high heat resistance, that is, withstand temperatures of higher than about 400° C., and exhibit excellent other properties including hardness, high-temperature electric insulation, water resistance, chemical resistance, and solvent resistance. The invention thus find great utility in applications of providing corrosion resistant, oxidation resistant coatings on metallic substrates and heat resistant, dielectric coatings on conductors.

EXAMPLE

Examples of the present invention are given below by way of illustration and not by way of limitation.

The organic silicon polymers used in Examples were synthesized by the following procedures. The first two examples are illustrative of the synthesis of polycarbosilanes.

REFERENCE EXAMPLE 1

A 5-liter, three-necked flask was charged with 2.5 liters of dry xylene and 400 grams of metallic sodium and heated to the boiling point of xylene in a nitrogen gas stream whereby metallic sodium was dissolved and dispersed. To the flask, 1 liter of dimethyldichlorosilane was added dropwise over one hour. At the end of addition, the reaction mixture was heated under reflux until the reaction was completed. The resulting precipitate was removed by filtration from the reaction mixture, which was washed with methanol and then with water, yielding 400 grams of polysilane in white powder form. Then an autoclave equipped with a gas inlet tube, agitator, condenser, and distillation tube was charged with 400 grams of polysilane, which was subjected to polymerization under a pressure of 5 kg/cm²G at 450° C.

There was obtained a polycarbosilane, designated Polymer A, having a number average molecular weight of 1250.

REFERENCE EXAMPLE 2

Reference Example 1 was repeated except that autoclave polymerization was under a pressure of 5 kg/cm²G at 430° C. There was obtained a polycarbosilane, designated Polymer B, having a number average molecular weight of 900.

The following two examples are illustrative of the synthesis of polysilazanes.

REFERENCE EXAMPLE 3

A dry 1-liter, four-necked flask equipped with a stirrer, thermometer, ammonia inlet tube, and deeply cooled condenser was charged with 850 ml of hexane and then with a mixture of 40.3 grams of methyldichlorosilane, 7.5 grams of methyltrichlorosilane, and 12.9 grams of dimethyldichlorosilane, and cooled to −20° C. Excess ammonia gas was admitted into the solution for 4 hours at a flow rate of 12 liter/hour for reaction. Thereafter, the reaction mixture was warmed to room temperature while the condenser was replaced by an ambient cooling condenser so that unreacted ammonia could escape from the reactor. By removing the ammonium chloride by-product by filtration and stripping off the hexane solvent, there was obtained 27.3 grams of liquid silazane.

Next, a 300-ml flask equipped with a stirrer, thermometer, dropping funnel, and gas inlet tube was charged with 0.2 grams of potassium hydride and 125 ml of tetrahydrofuran. To the flask was added 27.3 grams of the liquid silazane in 75 ml of tetrahydrofuran at room temperature through the dropping funnel. Evolution of a large volume of gas was observed during the addition. The temperature was raised to 60° C., at which reaction was continued for 2 hours until completion. Then the reaction solution was cooled down. Addition of 2.5 grams of methyl iodide resulted in a white precipitate of KI. After the majority of tetrahydrofuran was removed, 80 ml of hexane was added to the residual white slurry. The mixture was filtered and the hexane was removed from the filtrate in a vacuum of 1 mmHg at 70° C., yielding 25.3 grams of a solid silazane polymer, designated Polymer C, having a number average molecular weight of 1200.

REFERENCE EXAMPLE 4

A dry 2-liter, four-necked flask equipped with a stirrer, thermometer, gas inlet tube, and condenser was charged with 1.5 liters of toluene and then with a mixture of 149.5 grams (1 mol) of methyltrichlorosilane and 261 grams (2.4 mol) of trimethylchlorosilane. Ammonia gas was admitted into the solution at room temperature for 3 hours at a flow rate of 90 liter/min. (total $NH_3$ added 12 mol). With stirring, the reaction mixture was aged for one hour at room temperature until the reaction was complete. The ammonium chloride by-product was removed by filtration and washed with 2 liters of toluene. The toluene was stripped from the combined filtrate at 120° C. and 30 Torr, yielding 89 grams of a colorless clear silazane compound having a molecular weight of 436.

Next, a 300-ml flask equipped with a stirrer, thermometer, and condenser was charged with 89 grams of the silazane compound. The reactor was purged with nitrogen gas stream and slowly heated. A low molecular weight fraction distilled out at a temperature of 270° C. The temperature was further raised to 300° C. at which the reactor was held for two hours. On cooling the flask, there was yielded 55 grams of a pale yellow solid, designated Polymer D, having a number average molecular weight of 1070.

EXAMPLES 1-7 AND COMPARATIVE EXAMPLES 1-2

Coating compositions were prepared in accordance with the formulation shown in Table 1. To stainless steel pieces of 50 mm×50 mm×3 mm which had been polished with #240 sand paper, degreased and cleaned, the coating compositions were applied to a thickness of 70 μm by means of a bar coater and then dried at room temperature. The coatings were subjected to preliminary drying at 250° C. for 30 minutes in air and then baked at the temperature in the atmosphere both reported in Table 1. The thus coated steel plates were examined by the following performance tests. The results are also shown in Table 1.

(1) Coating hardness

The coating was scratched by the pencil scratch test according to JIS K-5400 to determine pencil hardness.

(2) Adhesion

Adhesion was examined in accordance with JIS K-5400 by scribing the test piece on the coating surface at intervals of 1 mm, applying adhesive tape thereto, lifting off the tape, and counting the number of coating sections left adhered.

(3) Electric insulation

Electric insulation was measured with direct current at 500 V in accordance with JIS C-1303.

(4) Heat resistance

Heat resistance was examined by heating the test piece in air at 700° C. for 1,000 hours, allowing it to cool down, and observing whether or not the coating was cracked or separated.

(5) Water resistance

Water resistance was examined by immersing the test piece in hot water at 80° C. for 1,000 hours and observing whether or not the coating was cracked or separated.

(6) Alkali resistance

Alkali resistance was examined by immersing the test piece in 10% NaOH aqueous solution for 1,000 hours and observing the coating for cracking or separation.

(7) Corrosion resistance

Corrosion resistance was examined by immersing the test piece in 10% HCl aqueous solution for 1,000 hours and observing the coating for cracking or separation.

(8) Solvent resistance

Solvent resistance was examined by immersing the test piece in xylene for 1,000 hours and observing the coating for cracking or separation.

TABLE 1

| | | | Example | | | | | | | Comparative Example | |
|---|---|---|---|---|---|---|---|---|---|---|---|
| | | | 1 | 2 | 3 | 4 | 5 | 6 | 7 | 1 | 2 |
| Composition (wt %) | | | | | | | | | | | |
| Binding components | Organic silicon polymer | Polycarbosilane A | 20 | 10 | | | 15 | | | 20 | 10 |
| | | Polycarbosilane B | | | 20 | 10 | | 5 | | | |
| | | Polysilazane C | | 10 | | | | | | | 10 |
| | | Polysilazane D | | | | 10 | | 15 | 15 | | |
| | Silazane compound | Tetramethyldisilazane | | | | | 10 | | | | |
| | | Hexamethylcyclo-trisilazane | 10 | 20 | 10 | 10 | | 10 | 5 | 10 | 20 |
| | | Octamethylcyclo-tetrasilazane | | | | | | | 10 | | |
| | Inorganic filler | $Al_2O_3$ | 40 | 40 | 35 | | | 50 | | 40 | 40 |
| | | $SiO_2$ | | | 5 | | | | | | |
| | | $Si_3N_4$ | | | | 45 | | | | | |
| | | BN | | | | | 45 | | | | |
| | | $TiO_2$ | | | | | | | 40 | | |
| Solvent | | Xylene | 30 | 20 | | 25 | | 20 | 30 | 30 | 20 |
| | | Toluene | | | 30 | | 30 | | | | |
| | Total | | 100 | 100 | 100 | 100 | 100 | 100 | 100 | 100 | 100 |
| Baking | | Atmosphere | $NH_3$ | $NH_3$ | $NH_3$ | $N_2 + NH_3$ (1:1) | $N_2 + NH_3$ (1:1) | $NH_3$ | $NH_3$ | air | air |
| | | Conditions (°C./min.) | 700/30 | ← | ← | ← | ← | ← | ← | ← | ← |
| Coating properties | | | | | | | | | | | |
| Hardness | | | 9H | 6H | 6H | 7H | 7H | 6H | 8H | 3H | 2H |
| Adhesion | | | good | ← | ← | ← | ← | ← | ← | partial separation | partial separation |
| Insulation (Ω − cm) | | | $10^{13}$ | $10^{11}$ | $10^{12}$ | $10^{12}$ | $10^{11}$ | $10^{12}$ | $10^{12}$ | $10^8$ | $10^8$ |
| Heat resistance | | | good | ← | ← | ← | ← | ← | ← | partial separation | ← |
| Water resistance | | | good | ← | ← | ← | ← | ← | ← | ← | ← |
| Alkali resistance | | | good | ← | ← | ← | ← | ← | ← | ← | ← |
| Corrosion resistance | | | good | ← | ← | ← | ← | ← | ← | partial separation | ← |
| Solvent resistance | | | good | ← | ← | ← | ← | ← | ← | ← | ← |

As seen from Table 1, the coatings obtained by applying and baking the heat resistant coating compositions of Examples 1-7 are excellent in various properties including substrate adhesion, hardness, insulation, heat resistance, water resistance, and chemical resistance.

EXAMPLES 8–14 AND COMPARATIVE EXAMPLES 3–4

Coating compositions for the first layer were prepared in accordance with the formulation shown in Table 2. To stainless steel pieces of 50 mm×50 mm×3 mm which has been polished with #240 sand paper, degreased and cleaned, the first coating compositions were applied to a thickness of 70 μm by means of a bar coater and then dried at room temperature. The first coatings were baked at the temperature in the atmosphere both reported in Table 2.

Then, coating compositions of the second layer were prepared in accordance with the formulation shown in Table 2. The second coating compositions were applied to a thickness of 10 μm by means of a bar coater, dried, and then baked at the temperature in the atmosphere both reported in Table 2.

The double coated steel plates were examined by the same performance tests as before. The results are shown in Table 2.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for forming a heat resistant, dielectric coating comprising the steps of
    applying a heat resistant coating composition comprising an organic silicon polymer, a silazane compound selected from the group consisting of tetramethyldisilazane, hexamethylcyclotrisilazane, octamethylcyclotetrasilazane and mixtures thereof, and an inorganic filler to a substrate, and
    baking the coating in an atmosphere of ammonia gas or a mixture of ammonia gas and an inert gas.

2. The method of claim 1 wherein said coating composition contains about 5 to about 40% by weight of silazane compound and about 10 to about 70% by weight of inorganic filler, the remainder being organic silicon polymer.

3. The method of claim 1 wherein the baking step is at a temperature of 200° to 1000° C.

4. The method of claim 1 wherein the organic silicon polymer is selected from the group consisting of polycarbosilanes and polysilazanes.

TABLE 2

| | | | Example 8 | 9 | 10 | 11 | 12 | 13 | 14 | Comparative Example 3 | 4 |
|---|---|---|---|---|---|---|---|---|---|---|---|
| First layer composition (wt %) | | | | | | | | | | | |
| Binding components | Organic silicon polymer | Polycarbosilane A | 20 | 10 | | | 15 | | | 20 | 10 |
| | | Polycarbosilane B | | | 20 | 10 | | 5 | | | |
| | | Polysilazane C | | 10 | | | | | | | 10 |
| | | Polysilazane D | | | | 10 | | 15 | 15 | | |
| | Silazane compound | Tetramethyldisilazane | | | | | 10 | | | | |
| | | Hexamethylcyclotrisilazane | 10 | 20 | 10 | 10 | | 10 | 5 | | |
| | | Octamethylcyclotetrasilazane | | | | | | | 10 | | |
| | Inorganic filler | Al$_2$O$_3$ | 40 | 40 | 35 | | | 50 | | 50 | 20 |
| | | SiO$_2$ | | | 5 | | | | | | 20 |
| | | Si$_3$N$_4$ | | | | 45 | | | | | |
| | | BN | | | | | 45 | | | | |
| | | TiO$_2$ | | | | | | | 40 | | |
| Solvent | | Xylene | 30 | 20 | | 25 | | 20 | 30 | 30 | 20 |
| | | Toluene | | | 30 | | 30 | | | | |
| Baking | | Atmosphere | air | ← | ← | ← | ← | ← | ← | ← | ← |
| | | Conditions (°C./min.) | 700/30 | ← | ← | ← | ← | ← | ← | ← | ← |
| Second layer composition (wt %) | | | | | | | | | | | |
| Organic silicon polymer | | Polycarbosilane A | 50 | 60 | 50 | | | 50 | | | |
| | | Polysilazane C | | | | 50 | 50 | | 50 | 50 | 50 |
| Solvent | | Xylene | 50 | 40 | 50 | 50 | 50 | 50 | 50 | 50 | 50 |
| Baking | | Atmosphere | NH$_3$ | ← | ← | ← | ← | NH$_3$ N$_2$ | ← | air | N$_2$ |
| | | Conditions (°C./min.) | 600/30 | ← | ← | ← | ← | ← | ← | 600/30 | ← |
| Coating properties | | | | | | | | | | | |
| Hardness | | | 9H | 6H | 6H | 7H | 7H | 6H | 8H | 8H | 2H |
| Adhesion | | | good | ← | ← | ← | ← | ← | ← | partial separation | partial separation |
| Insulation (Ω — cm) | | | 10$^{13}$ | 10$^{13}$ | 10$^{13}$ | 10$^{13}$ | 10$^{13}$ | 10$^{13}$ | 10$^{13}$ | 10$^8$ | 10$^5$ |
| Heat resistance | | | good | ← | ← | ← | ← | ← | ← | partial separation | ← |
| Water resistance | | | good | ← | ← | ← | ← | ← | ← | ← | ← |
| Alkali resistance | | | good | ← | ← | ← | ← | ← | ← | ← | ← |
| Corrosion resistance | | | good | ← | ← | ← | ← | ← | ← | partial separation | ← |
| Solvent resistance | | | good | ← | ← | ← | ← | ← | ← | ← | ← |

As seem from Table 2, the coatings obtained by applying and baking the coating compositions twice as in Examples 8–14 are excellent in various properties including substrate adhesion, hardness, insulation, heat resistance, water resistance, and chemical resistance.

5. A substrate having a heat-resistant dielectric coating thereon, said coating being prepared by the method of claim 1.

6. A method for forming a heat resistant, dielectric coating comprising the steps of
applying a first coating composition comprising an organic silicon polymer, a silazane compound selected from the group consisting of tetramethyldisilazane, hexamethylcyclotrisilazane, octamethylcyclotetrasilazane and mixtures thereof, and an inorganic filler to a substrate,
baking the first composition to form a first coating layer,
applying a second coating composition comprising an organic silicon polymer to the first coating layer, and
baking the second composition to form a second coating layer on the first coating layer.

7. The method of claim 6 wherein the step of baking the first composition is carried out in air at a temperature of at least about 200° C.

8. The method of claim 6 wherein the step of baking the second composition is carried out at a temperature of 400° to 800° C.

9. The method of claim 6 wherein the step of baking the second composition is carried out in an atmosphere of ammonia gas or a mixture of ammonia gas and an inert gas.

10. The method of claim 6 wherein the organic silicon polymer is selected from the group consisting of polycarbosilanes and polysilazanes.

11. The method of claim 6 wherein said coating composition contains about 5 to about 40% by weight of silazane compound and about 10 to about 70% by weight of inorganic filler, the remainder being organic silicon polymer.

12. A substrate having a heat-resistant dielectric coating thereon, said coating being prepared by the method of claim 6.

* * * * *